(12) United States Patent
Lee et al.

(10) Patent No.: US 8,755,284 B2
(45) Date of Patent: Jun. 17, 2014

(54) METHOD AND APPARATUS FOR REQUESTING BANDWIDTH IN A WIRELESS COMMUNICATION SYSTEM

(75) Inventors: Eun Jong Lee, Anyang-si (KR); Ki Seon Ryu, Anyang-si (KR); Hee Jeong Cho, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 13/393,193

(22) PCT Filed: Aug. 30, 2010

(86) PCT No.: PCT/KR2010/005847
§ 371 (c)(1),
(2), (4) Date: Feb. 28, 2012

(87) PCT Pub. No.: WO2011/025334
PCT Pub. Date: Mar. 3, 2011

(65) Prior Publication Data
US 2012/0163321 A1    Jun. 28, 2012

Related U.S. Application Data

(60) Provisional application No. 61/237,699, filed on Aug. 28, 2009, provisional application No. 61/238,678, filed on Aug. 31, 2009, provisional application No. 61/248,886, filed on Oct. 6, 2009.

(30) Foreign Application Priority Data

Aug. 30, 2010    (KR) .................. 10-2010-0084058

(51) Int. Cl.
*H04L 12/26* (2006.01)

(52) U.S. Cl.
USPC ..................... 370/236; 370/471; 370/477

(58) Field of Classification Search
None
See application file for complete search history.

(56) References Cited

U.S. PATENT DOCUMENTS

| 6,529,499 | B1 * | 3/2003 | Doshi et al. ................... 370/352 |
| 2003/0007508 | A1 * | 1/2003 | Sala et al. ..................... 370/468 |

(Continued)

OTHER PUBLICATIONS

Samsung India Software Operations et al., "MAC SDU Fragmentation & Packing scheme for 16m", C80216m-09_0393, Feb. 2009.
Fujitsu, "SDD Text Proposal for IEEE 802.16m SCH", IEEE 802.16 Broadband Wireless Access Working Group, IEEE C802.16m-09/0034, Jan. 2009.

(Continued)

*Primary Examiner* — Ian N Moore
*Assistant Examiner* — Eric P Smith
(74) *Attorney, Agent, or Firm* — Lee, Hong, Degerman, Kang & Waimey (57) ABSTRACT

A method for requesting a bandwidth at a mobile terminal in a wireless communication system includes receiving, from a base station, information on whether the base station can compensate for changes in bandwidth request quantity caused by fragmentation or packing of a protocol data unit (PDU); requesting, to the base station, a bandwidth required for transmitting a first PDU; separating the first PDU and generating a second PDU and a third PDU in consideration of the quantity of allocated bandwidth when the quantity of bandwidth allocated by the base station is smaller than the requested quantity; transmitting the second PDU to the base station; and starting a first timer at the point in time the bandwidth allocation is received or at the point in time when the second PDU is transmitted and the information indicates that the base station can compensate for the changes in the bandwidth request quantity.

21 Claims, 7 Drawing Sheets

(56) References Cited

U.S. PATENT DOCUMENTS

| | | | |
|---|---|---|---|
| 2005/0008027 A1* | 1/2005 | Limb et al. | 370/442 |
| 2007/0086484 A1* | 4/2007 | Quigley et al. | 370/468 |
| 2009/0116436 A1* | 5/2009 | Okuda | 370/329 |
| 2010/0322187 A1* | 12/2010 | Tani et al. | 370/331 |

OTHER PUBLICATIONS

Etri, "Packing of non-ARQ connections (15.2.3.5)", IEEE 802.16 Broadband Wireless Access Working Group, IEEE C802.16m-09/1810, Aug. 2009.

* cited by examiner

METHOD AND APPARATUS FOR REQUESTING BANDWIDTH IN A WIRELESS COMMUNICATION SYSTEM

CROSS-REFERENCE TO RELATED APPLICATIONS

This application is the National Stage filing under 35 U.S.C. 371 of International Application No. PCT/KR2010/005847, filed on Aug. 30, 2010, which claims the benefit of earlier filing date and right of priority to Korean Patent Application No. 10-2010-0084058, filed on Aug. 30, 2010, and also claims the benefit of U.S. Provisional Application No. 61/248,886, filed on Oct. 6, 2009, 61/238,678, filed on Aug. 31, 2009 and 61/237,699, filed on Aug. 28, 2009, the contents of which are all incorporated by reference herein in their entirety.

TECHNICAL FIELD

The present invention relates to a wireless communication system and more particularly to a method and apparatus for requesting a bandwidth in a wireless communication system.

BACKGROUND ART

A conventional bandwidth request procedure is described below with reference to FIG. 1.

Figure 1:
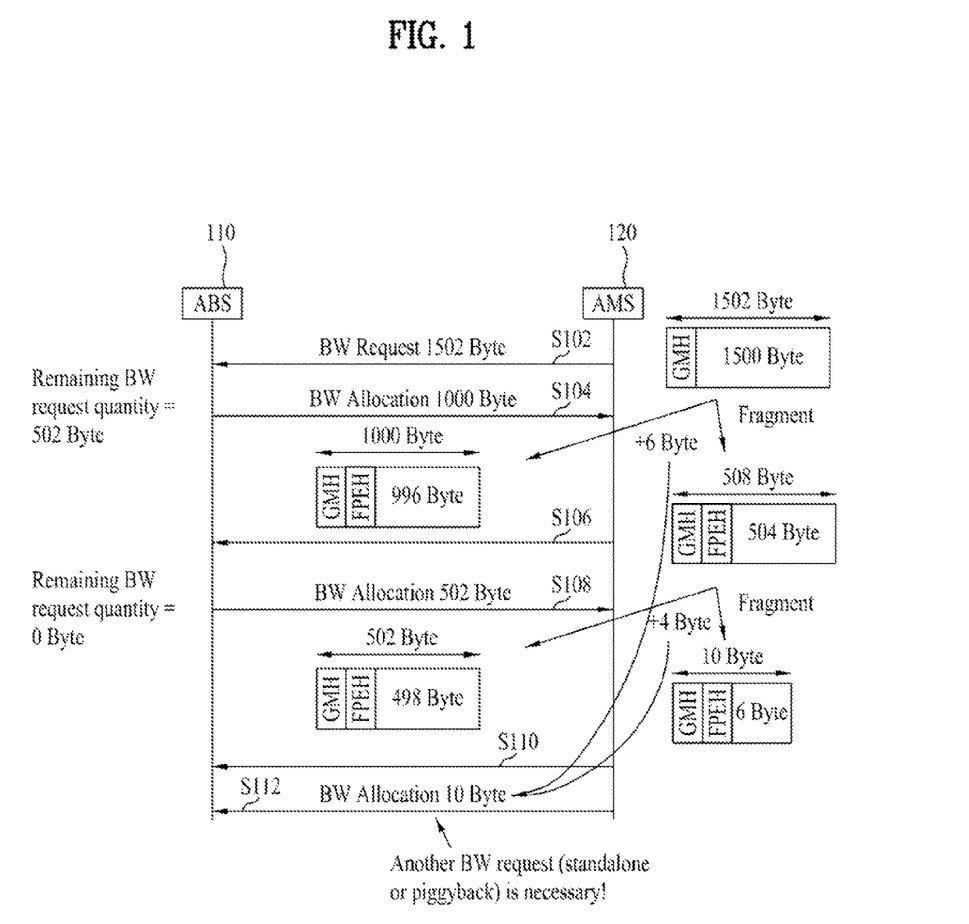
FIG. 1 illustrates a conventional bandwidth request procedure.

FIG. 1 illustrates the conventional bandwidth request procedure.

When an uplink resource is allocated to an Advanced Mobile Station (AMS), the AMS fragments or packs a MAC protocol data unit (PDU) taking into consideration the allocated bandwidth. When the AMS fragments or packs a MAC PDU, the AMS may add an extended header or remove a generic MAC header (GMH). The actual size of such a generated MAC PDU may differ from the size of a resource (or a resource unit) that the AMS has requested from an Advanced Base Station (ABS).

In FIG. 1, the AMS requests a 1502-byte uplink resource from the ABS. However, the ABS allocates only 1000 bytes. Thus, the AMS divides (or fragments) a payload of the PDU into two payloads and adds a fragmentation and packing extended header (FPEH) to each of the two payloads and adds a GMH to the second payload. Here, assuming that the FPEH and the GMH are each 2 bytes, the AMS needs 6 more bytes.

However, the ABS allocates, to the AMS, 502 bytes which have not been allocated to the AMS among 1502 bytes requested by the AMS. Then, the AMS divides a second PDU into two units since the AMS cannot transmit the second PDU using the allocated 502 bytes. Therefore, the AMS requires 4 more bytes.

As a result, the AMS requires 10 more bytes since the PDU is divided twice. This increases latency and wastes resources.

Figure 2:
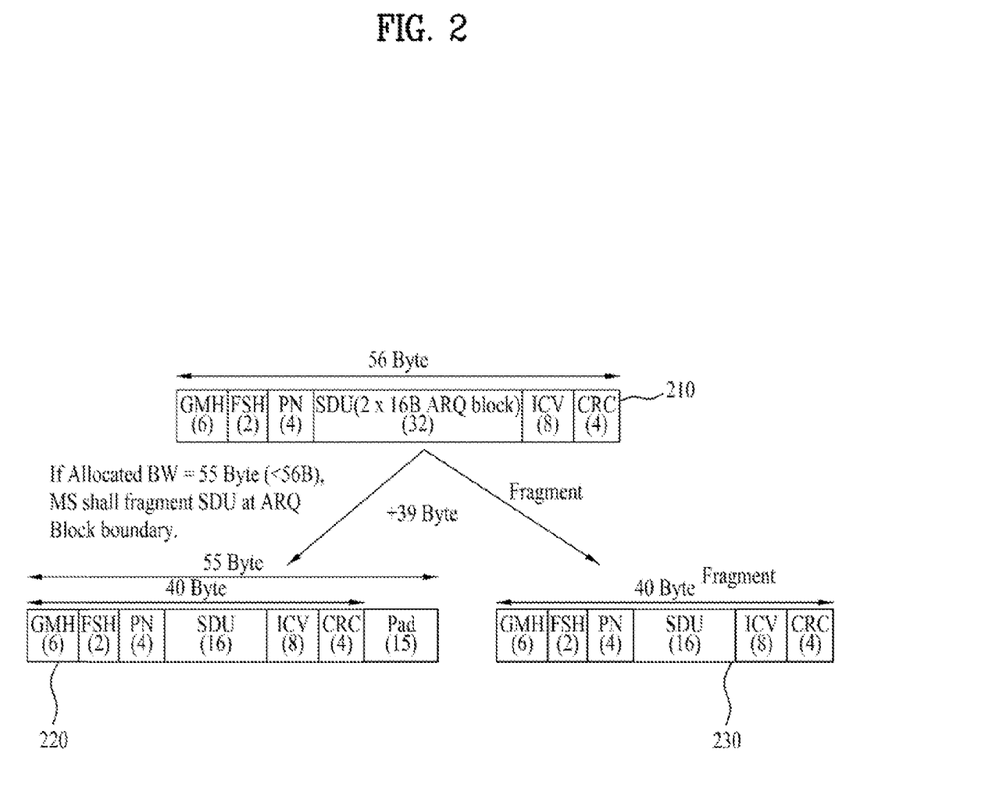
FIG. 2 illustrates an example in which an AMS pads an allocated resource.

FIG. 2 illustrates an example in which the AMS pads an allocated resource. As shown in FIG. 2, 56 bytes are needed to transmit two 16-byte ARQ blocks. However, if the AMS separates the two ARQ blocks to configure PDUs when the ABS has allocated 55 bytes to the AMS, the first PDU is 40 bytes. Accordingly, of the allocated 55 bytes, 15 bytes are padded. Then, to transmit the second PDU, the AMS additionally requests a resource.

Although a MAC management message is discriminated (or identified) basically using two connections, a flow ID currently used for the MAC management message has only one value. If the MAC management message is discriminated using only one flow ID, it is difficult to identify a delay sensitive message among MAC management messages and therefore it is difficult to provide services suitable for MAC management messages.

DISCLOSURE

Technical Problem

As described above, latency is increased and resources are wasted when the ABS allocates, to the AMS, an amount of resources less than that requested by the AMS.

An object of the present invention is to provide a bandwidth request method that can reduce latency and allow efficient use of resources.

Objects of the present invention are not limited to those described above and other objects will be clearly understood by those skilled in the art from the following description.

Technical Solution

In a method for an AMS to request a bandwidth in a wireless communication system in accordance with one aspect of the present invention to achieve the above objects, the AMS receives information, indicating whether or not an ABS can compensate for a bandwidth request change due to PDU fragmentation or packing, from the ABS, requests a bandwidth, required to transmit a first PDU, from the ABS, fragments, upon receiving allocation of a bandwidth less than the requested bandwidth from the ABS, the first PDU taking into consideration the allocated bandwidth to generate a second PDU and a third PDU, transmits the second PDU to the ABS, and starts a first timer upon receiving the allocation of the bandwidth or upon transmitting the second PDU if the information indicates that the ABS can compensate for a bandwidth request change due to PDU fragmentation or packing.

Here, the first timer may be received from the ABS through a MAC management message and may also be predetermined between the ABS and the AMS.

In addition, the AMS may receive, from the ABS, allocation of a bandwidth required to transmit the third PDU.

Further, the AMS may further include requesting, from the ABS, a bandwidth required to transmit the third PDU if the AMS does not receive allocation of a bandwidth from the ABS until the first timer expires.

In a method for an ABS to allocate a bandwidth in a wireless communication system in accordance with another one aspect of the present invention to achieve the above objects, the ABS transmits information, indicating whether or not the ABS can compensate for a bandwidth request change due to PDU fragmentation or packing, to an AMS, receives a request for a bandwidth required to transmit a first PDU from the AMS, allocating a bandwidth less than the bandwidth requested by the AMS to the AMS, and receives a second PDU through the allocated bandwidth, wherein, when the AMS receives allocation of the bandwidth less than the bandwidth requested by the AMS, the AMS fragments the first PDU into the second PDU and a third PDU and starts a timer upon receiving the allocation of the bandwidth or upon transmitting the second PDU to the ABS if the information indicates that the ABS can compensate for a bandwidth request change due to PDU fragmentation or packing.

An AMS in a wireless communication system in accordance with another one aspect of the present invention to achieve the above objects includes a transmission module for requesting, from an ABS, a bandwidth required to transmit a first PDU and transmitting a second PDU to the ABS, a reception module for receiving, from the ABS, information indicating whether or not the ABS can compensate for a bandwidth request change due to PDU fragmentation or packing and bandwidth allocation information, and a processor for fragmenting, when the ABS allocates a bandwidth less than a bandwidth requested by the AMS to the AMS, the first PDU taking into consideration the allocated bandwidth to generate a second PDU and a third PDU and starting a timer upon receiving the allocation of the bandwidth or upon transmitting the second PDU if the information indicates that the ABS can compensate for a bandwidth request change due to PDU fragmentation or packing.

An ABS in a wireless communication system in accordance with another one aspect of the present invention to achieve the above objects includes a transmission module for transmitting information, indicating whether or not the ABS can compensate for a bandwidth request change due to PDU fragmentation or packing, and a value of a timer to an AMS, and a reception module for receiving a bandwidth request from the AMS, wherein the timer starts when the AMS receives allocation of a bandwidth less than a bandwidth requested by the AMS or when the AMS transmits a part of a PDU that is to be transmitted.

In a method for an ABS to transmit control information in a wireless communication system in accordance with another one aspect of the present invention to achieve the above objects, the ABS generates an extended header including a delay tolerant message indication which indicates whether a MAC management message is a delay tolerant message or a non-delay-tolerant message, and transmits the extended header to an AMS.

Here, the extended header may include fragmentation-related control information.

In a method for an AMS to receive control information in a wireless communication system in accordance with another one aspect of the present invention to achieve the above objects, the AMS receives an extended header including a delay tolerant message indication which indicates whether a MAC management message is a delay tolerant message or a non-delay-tolerant message from an ABS.

An ABS in a wireless communication system in accordance with another one aspect of the present invention to achieve the above objects includes a processor for generating an extended header including a delay tolerant message indication which indicates whether a MAC management message is a delay tolerant message or a non-delay-tolerant message, and a transmission module for transmitting the extended header to an AMS.

An AMS in a wireless communication system in accordance with another one aspect of the present invention to achieve the above objects includes a reception module for receiving an extended header including a delay tolerant message indication which indicates whether a MAC management message is a delay tolerant message or a non-delay-tolerant message from an ABS.

Advantageous Effects

According to embodiments of the present invention, it is possible to reduce latency and to efficiently use resources.

Advantages of the present invention are not limited to those described above and other advantages will be clearly understood by those skilled in the art from the following description.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the mobile communication system is a 3rd Generation Partnership Project 2 (3GPP2) 802.16 system, the following descriptions, except descriptions specific to the 3GPP2 802.16 system, may be applied to any other mobile communication system.

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "terminal" is used to generally describe any mobile or stationary user device such as a User Equipment (UE), a Mobile Station (MS), or an Advanced Mobile Station (AMS). In addition, the term "base station" is used to generally describe any network node that communicates with the terminal such as a Node B, an eNode B, or an Advanced Base Station (ABS).

First, a bandwidth request method according to a first embodiment of the present invention is described below with reference to FIGS. 3 and 4.

Figure 3:
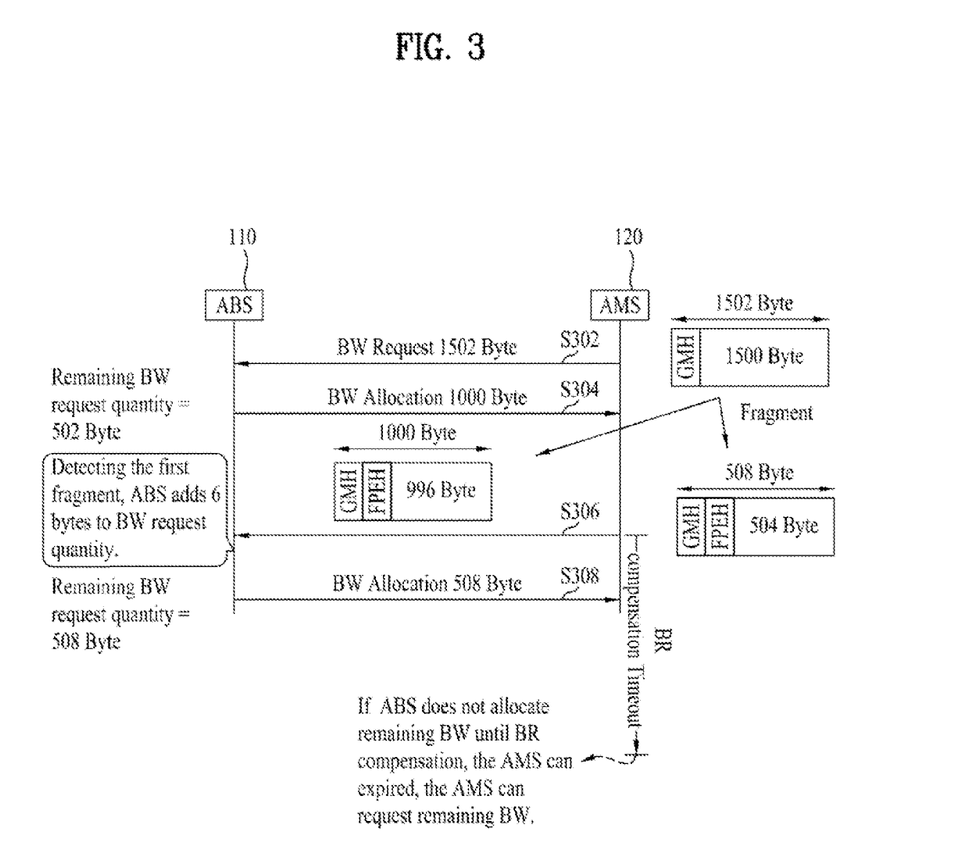
FIG. 3 illustrates one exemplary bandwidth request method according to a first embodiment of the present invention.
Figure 4:
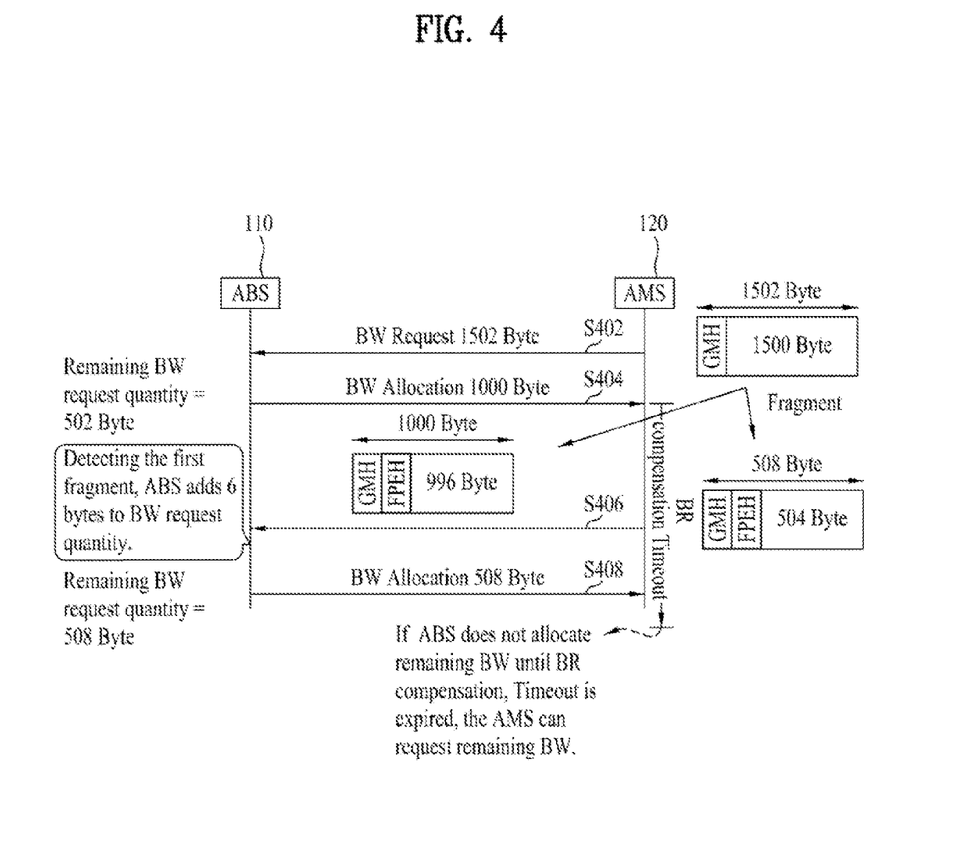
FIG. 4 illustrates another exemplary bandwidth request method according to the first embodiment of the present invention.

FIG. 3 illustrates one exemplary bandwidth request method according to the first embodiment of the present invention and FIG. 4 illustrates another exemplary bandwidth request method according to the first embodiment of the present invention.

When a terminal (AMS) fragments or packs a protocol data unit (PDU) after requesting a bandwidth from a base station (ABS), a bandwidth required to transmit the PDU may be changed due to fragmentation or packing of the PDU.

According to the first embodiment of the present invention, the ABS may automatically compensate for a bandwidth request change (i.e., a change in the requested bandwidth) due to PDU fragmentation or packing.

Specifically, as shown in FIG. 3, when the ABS has allocated only 1000 bytes although the AMS has requested 1502 bytes to transmit a first PDU, the AMS divides a payload of the first PDU into two payloads, generates a second PDU by adding a fragmentation and packing extended header (FPEH) to the first payload, and generates a third PDU by adding a generic MAC header (GMH) and an FPEH to the second payload. When the GMH and the FPEH are each 2 bytes, the AMS requires 6 more bytes.

When the ABS has allocated only 1000 bytes although the AMS has requested 1502 bytes, the ABS may determine that the AMS will fragment a PDU and require 6 more bytes. That is, although the ABS has not additionally received a bandwidth request from the AMS, the ABS may calculate and compensate for a change in the bandwidth requested by the AMS.

The AMS needs to be aware that the ABS can automatically compensate for a bandwidth request change due to PDU fragmentation or packing. The AMS also needs a timer for awaiting additional bandwidth allocation.

Accordingly, the first embodiment of the present invention suggests a bandwidth request (BR) compensation support parameter and a BR compensation timeout parameter. Table 1 shows details of the BR compensation support parameter and the BR compensation timeout parameter.

TABLE 1

| Name | Value |
| --- | --- |
| Bandwidth request compensation support | Indicates capability to automatically compensate BW request change due to fragmentation, packing or ARQ fragmentation. |
| BR compensation Timeout | AMS shall wait BW allocation until BR compensation timeout is expired, This timer starts when transmitting MPDU with fragmentation, packing or ARQ fragmentation (or when ABS allocates insufficient BW for AMS). This timeout may have multiple values according to the QoS type. |

As shown in Table 1, the BR compensation support parameter indicates the capability to automatically compensate for a bandwidth request change due to fragmentation, packing, or ARQ fragmentation. For example, the BR compensation support parameter indicates that the ABS can automatically compensate for a bandwidth request change due to PDU fragmentation or packing when the BR compensation support parameter is 1 and indicates that the ABS cannot automatically compensate for a bandwidth request change due to PDU fragmentation or packing when the BR compensation support parameter is 0.

The BR compensation timeout parameter indicates a value of a BR compensation timer that starts when the AMS transmits the second PDU to the ABS or when a bandwidth less than that requested by the AMS is allocated to the AMS. The AMS awaits additional bandwidth allocation from the ABS until the BR compensation timer expires. When an additional bandwidth is not allocated to the AMS until the timer expires, the AMS may request a bandwidth for transmission of a third PDU. The BR compensation timer may have multiple values for data QoS.

The ABS and the AMS may notify each other of the bandwidth request compensation capability by transmitting and receiving a BR compensation support parameter through a MAC management message. For example, the AMS may transmit a BR compensation support parameter to the ABS through a registration request (REG-REQ) message or a ranging request (RNG-REQ) message and the ABS may transmit a BR compensation support parameter to the AMS through a registration response (REG-RSP) message or a ranging response (RNG-RSP) message.

The ABS may notify the AMS of the value of the BR compensation timer through a MAC management message. The value of the BR compensation timer may also be predetermined between the ABS and the AMS.

FIGS. 3 and 4 illustrate an example in which the ABS can automatically compensate for a bandwidth request change due to PDU fragmentation or packing. Specifically, FIG. 3 illustrates the case in which the AMS starts the BR compensation timer upon transmitting a second PDU to the ABS and FIG. 4 illustrates the case in which the AMS starts the BR compensation timer upon receiving, from the ABS, allocation of a bandwidth less than that requested by the AMS.

As shown in FIGS. 3 and 4, the AMS requests 1502 bytes, which corresponds to a bandwidth required to transmit the first PDU, from the ABS. However, the ABS allocates a bandwidth of 1000 bytes, which is smaller than that requested by the AMS, to the AMS. Thus, the AMS divides a payload of the first PDU into two payloads. That is, the AMS divides 1500 bytes into 996 bytes and 504 bytes. Then, the AMS adds an FPEH to the 996 bytes to generate a second PDU and adds a GMH and an FPEH to the 504 bytes to generate a third PDU. The AMS transmits the second PDU to the ABS through the 1000-byte bandwidth that the ABS has allocated to the AMS.

Then, the ABS calculates a bandwidth required to transmit the third PDU as 508 bytes and allocates a bandwidth for 508-byte transmission to the AMS.

Here, the AMS starts the BR compensation timer upon transmitting the second PDU to the ABS or upon receiving allocation of a bandwidth less than that requested by the AMS from the ABS.

Next, a bandwidth request method according to a second embodiment of the present invention is described below with reference to FIGS. 5 and 6.

Figure 5:
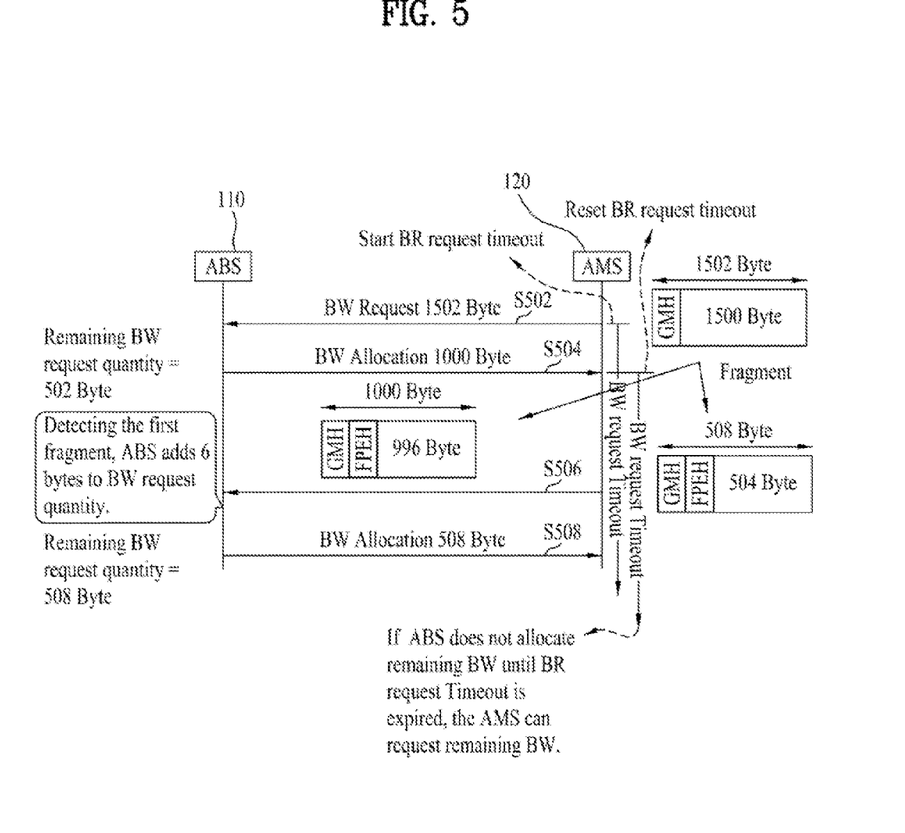
FIG. 5 illustrates one exemplary bandwidth request method according to a second embodiment of the present invention.
Figure 6:
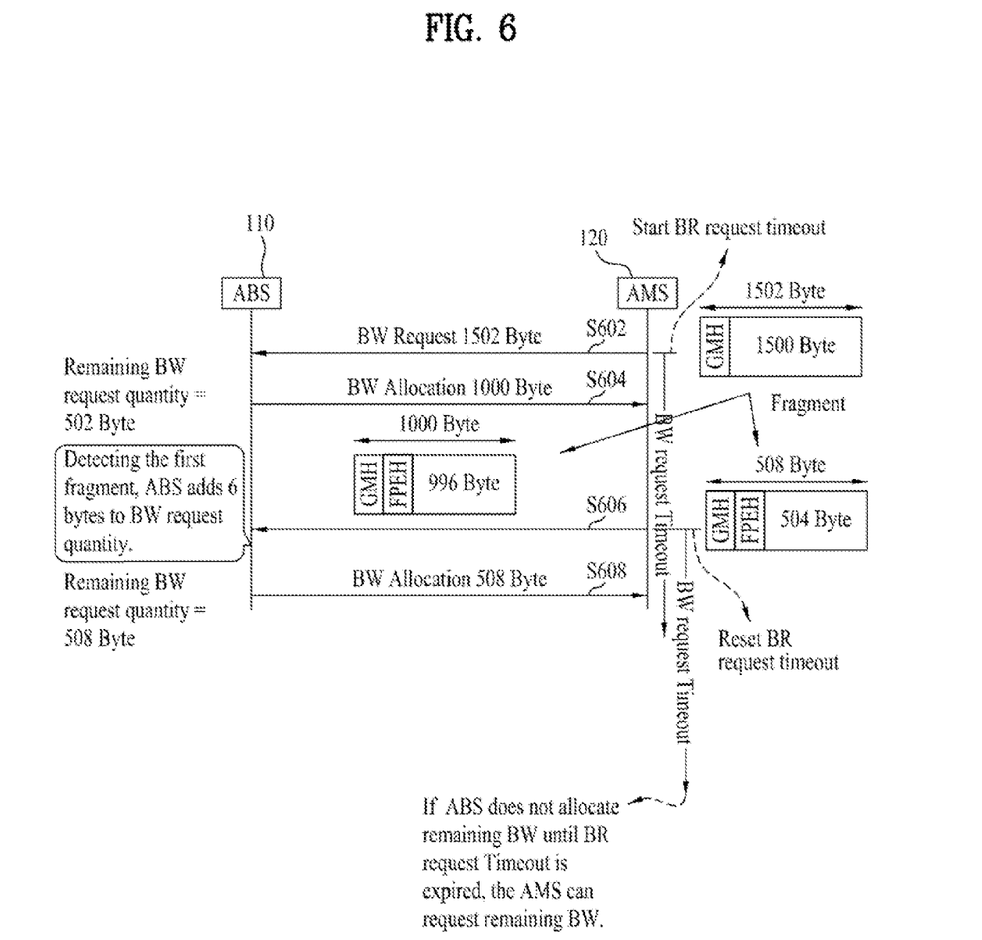
FIG. 6 illustrates another exemplary bandwidth request method according to the second embodiment of the present invention.

FIG. 5 illustrates one exemplary bandwidth request method according to the second embodiment of the present invention and FIG. 6 illustrates another exemplary bandwidth request method according to the second embodiment of the present invention.

The AMS may start a bandwidth request timer after requesting a bandwidth regardless of whether or not the ABS can automatically compensate for a bandwidth request change due to PDU fragmentation or packing. The AMS requests a bandwidth when no bandwidth is allocated to the AMS until the bandwidth request timer expires.

In the second embodiment of the present invention, the AMS uses a bandwidth request timer as a timer for awaiting additional bandwidth allocation from the ABS.

The AMS receives information, indicating whether or not the ABS can automatically compensate for a bandwidth request change due to PDU fragmentation or packing, through the BR compensation support parameter described above in the first embodiment.

As shown in FIGS. 5 and 6, the AMS requests 1502 bytes, which corresponds to a bandwidth required to transmit the first PDU, from the ABS. Then, the AMS starts the bandwidth request timer.

However, the ABS allocates a bandwidth of 1000 bytes, which is smaller than that requested by the AMS, to the AMS. Thus, the AMS divides a payload of the first PDU into two payloads. That is, the AMS divides 1500 bytes into 996 bytes and 504 bytes. Then, the AMS adds an FPEH to the 996 bytes to generate a second PDU and adds a GMH and an FPEH to the 504 bytes to generate a third PDU. The AMS transmits the second PDU to the ABS through the 1000-byte bandwidth that the ABS has allocated to the AMS.

Then, the ABS calculates a bandwidth required to transmit the third PDU as 508 bytes and allocates a bandwidth for 508-byte transmission to the AMS.

Here, the AMS restarts the bandwidth request timer upon transmitting the second PDU to the ABS or upon receiving allocation of a bandwidth less than that requested by the AMS from the ABS.

Next, a control information transmission method according to a third, embodiment of the present invention is described below.

Although a MAC management message can be discriminated (or identified) basically using two connections, a flow ID currently used for the MAC management message has only one value. If the MAC management message is discriminated using only one flow ID, it is difficult to identify a delay sensitive message among MAC management messages.

The third embodiment of the present invention suggests a delay tolerant message indication which indicates whether a corresponding MAC management message is a delay tolerant message or a non-delay-tolerant message. The delay tolerant message indication may be transmitted within an extended header.

Table 2 shows an extended header including a delay tolerant message indication and Table 3 shows fields of the extended header.

TABLE 2

| Syntax | Size (bit) | Notes |
|---|---|---|
| FEH ( ) { | — | |
| EC | 1 | Encryption Control indicator |
| DTI | 1 | Delay tolerant message indication |
| If (FC != 00){ | | If fragment(s) exists, this EH shall contain SN. |
| SN | 8 | Payload sequence number |
| FC | 2 | Fragmentation control |
| } | | |
| Reserved | 5 | Reserved |
| } | — | |

TABLE 3

| Name | Length (bit) | Description |
|---|---|---|
| EC | 1 | Encryption control indicator0 = encryption is disabled1 = encryption is enabled |
| DTI | 1 | Delay tolerant message indication0 = Delay non-tolerant message1 = Delay tolerant message |
| SN | 8 | MAC management fragment sequence number |
| FC | 2 | Fragmentation Control bits (Table 16) |
| Reserved | tbd | Reserved |

Table 2 shows the case in which a delay tolerant message indication is included in an extended header including fragmentation-related control information. The extended header including the fragmentation-related control information may be referred to as a fragmentation extended header (FEH) or a MAC control extended header (MCEH).

As shown in Table 3, the ABS may set the delay tolerant message indication to 1 when the MAC management message is a delay tolerant message and may set the delay tolerant message indication to 0 when the MAC management message is a non-delay-tolerant message.

When the ABS transmits an extended header including a delay tolerant message indication to the AMS, the AMS can determine whether the MAC management message is a delay tolerant message or a non-delay-tolerant message through the delay tolerant message indication.

An indication of a general message and a delay sensitive message may also be used. Table 4 shows an extended header including a delay sensitive message indication and Table 5 shows fields of the extended header.

TABLE 4

| Syntax | Size (bit) | Notes |
|---|---|---|
| FEH ( ) { | — | |
| EC | 1 | Encryption Control indicator |
| DSI | 1 | Delay sensitive message indication |
| If (FC != 00){ | | If fragment(s) exists, this EH shall contain SN. |
| SN | 8 | Payload sequence number |
| FC | 2 | Fragmentation control |
| } | | |
| Reserved | 5 | Reserved |
| } | — | |

TABLE 5

| Name | Length (bit) | Description |
|---|---|---|
| EC | 1 | Encryption control indicator0 = encryption is disabled1 = encryption is enabled |
| DSI | 1 | Delay sensitive message indication0 = Normal MAC management message1 = Delay sensitive MAC management message |
| SN | 8 | MAC management fragment sequence number |
| FC | 2 | Fragmentation Control bits (Table 16) |
| Reserved | tbd | Reserved |

An indication for discriminating between a primary connection and a basic connection may also be used. Table 6 shows an extended header including a primary connection indication and Table 7 shows fields of the extended header.

TABLE 6

| Syntax | Size (bit) | Notes |
|---|---|---|
| FEH ( ) { | — | |
| EC | 1 | Encryption Control indicator |
| PCI | 1 | primary connection indication |
| If (FC != 00){ | | If fragment(s) exists, this EH shall contain SN. |
| SN | 8 | Payload sequence number |
| FC | 2 | Fragmentation control |
| } | | |
| Reserved | 5 | Reserved |
| } | — | |

TABLE 7

| Name | Length (bit) | Description |
|---|---|---|
| EC | 1 | Encryption control indicator0 = encryption is disabled1 = encryption is enabled |
| PCI | 1 | Primary connection indication0 = Basic connection MAC management message1 = Primary connection MAC management message |
| SN | 8 | MAC management fragment sequence number |
| FC | 2 | Fragmentation Control bits (Table 16) |
| Reserved | tbd | Reserved |

Figure 7:
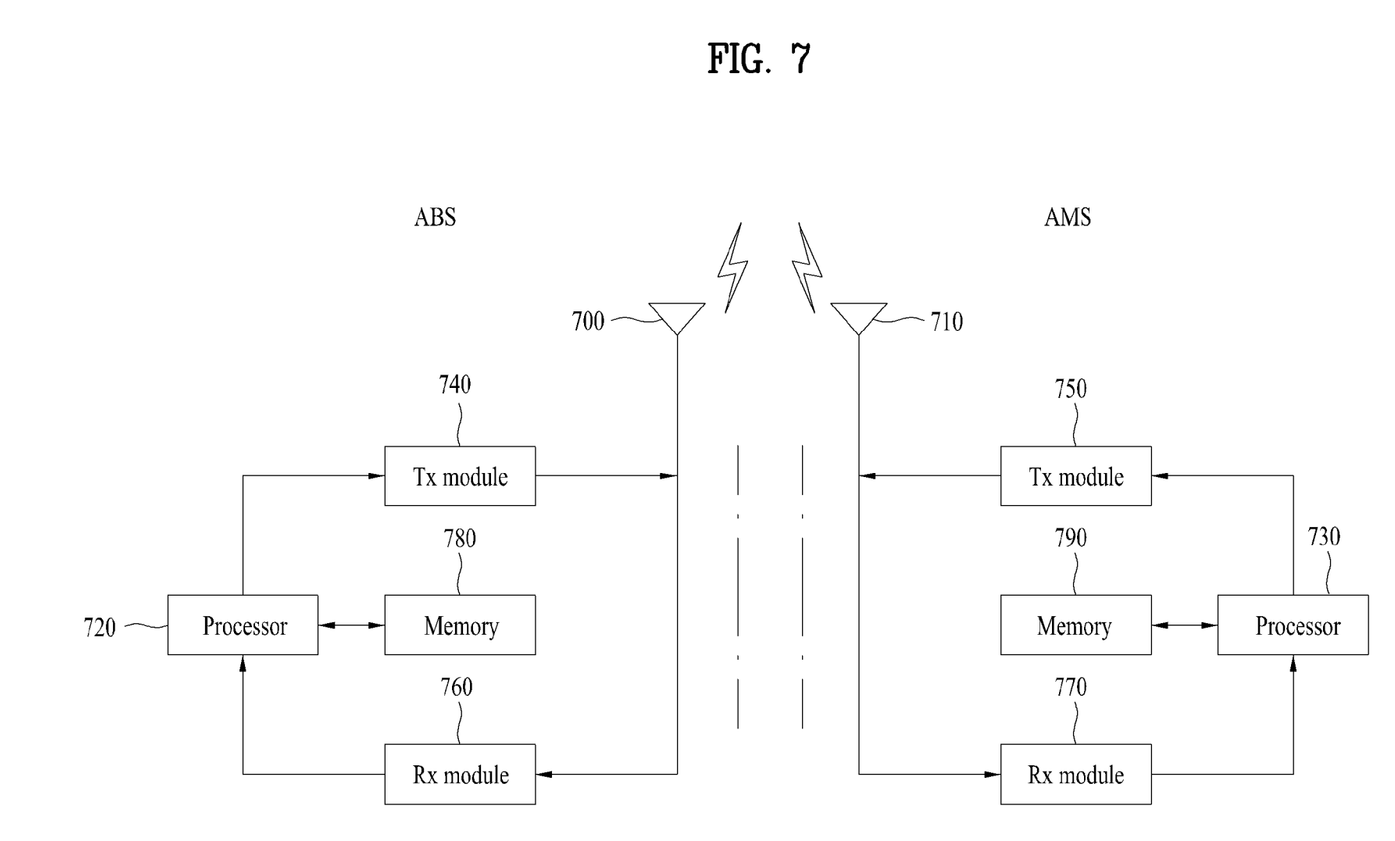
FIG. 7 illustrates a configuration of an AMS and an ABS through which the embodiments of the present invention can be implemented.

FIG. 7 illustrates a configuration of a mobile station and a base station according to another embodiment of the present invention, through which the embodiments of the present invention described above can be implemented.

An Advanced Mobile Station (AMS) and an Advanced Base Station (ABS) may include antennas 400 and 410 for transmitting and receiving information, data, signals, messages, and/or the like, transmission modules (Tx modules) 440 and 450 for transmitting messages through antenna control, reception modules (Rx modules) 460 and 470 for receiving messages through antenna control, memories 480 and 490 for storing information items associated with communication between the AMS and the ABS, and processors 420 and 430 for controlling the transmission modules, the reception modules, and the memories, respectively. Here, the ABS may be a femto ABS or a macro ABS.

The antennas 400 and 410 function to transmit signals generated by the transmission modules 440 and 450 to the outside or to receive radio signals from the outside and deliver the received radio signals to the reception modules 460 and 470. In the case in which a multi-antenna (MIMO) function is supported, 2 or more antennas may be provided.

The processors 420 and 430 generally control overall operations of the AMS and the ABS, respectively. Specifically, each of the processors 420 and 430 may perform a control function for implementing the embodiments of the present invention described above, a function to perform MAC frame variable control according to service characteristics and radio environments, a handover function, authentication and encryption functions, and the like. Each of the processors 420 and 430 may also include an encryption module that can control encryption of a variety of messages and a timer module that controls transmission and reception of a variety of messages.

When the AMS has received allocation of a bandwidth less than that requested by the AMS from the ABS, the processor 430 of the AMS may fragment the first PDU to generate a second PDU and a third PDU taking into consideration the allocated bandwidth and starts a timer upon receiving bandwidth allocation information from the ABS or upon transmitting the second PDU.

The transmission modules 440 and 450 may perform coding and modulation of signals and/or data, which have been scheduled by the processors to be transmitted to the outside, and then may deliver the resulting signals and/or data to the antennas 400 and 410, respectively.

The transmission module 450 of the AMS requests a bandwidth, required to transmit the first PDU, from the ABS and transmits the second PDU as a part of the first PDU. The AMS then requests a bandwidth for transmission of the third PDU from the ABS if a bandwidth for transmission of the third PDU, which is the remaining part of the first PDU, is not allocated to the AMS until the timer expires.

The transmission module 440 of the ABS transmits information indicating whether or not the ABS can compensate for a bandwidth request change due to PDU fragmentation or packing to the AMS and transmits bandwidth allocation information to the AMS.

The reception modules 460 and 470 may perform decoding and demodulation upon radio signals received from the outside through the antennas 400 and 410 to restore the radio signals into original data and then may deliver the original data to the processors 420 and 430, respectively.

The reception module 470 of the AMS receives the information indicating whether or not the ABS can compensate for a bandwidth request change due to PDU fragmentation or packing and the bandwidth allocation information from the ABS.

The reception module 460 of the ABS receives a bandwidth request from the AMS.

The memories 480 and 490 may store programs for processing and control by the processors and may also temporarily store input/output data items. In the case of the AMS, the temporarily stored input/output data items include a UL grant, system information, a station identifier (STID), a flow identifier (FID), an action time, region allocation information, and frame offset information, and the like.

The memories may include a storage medium of at least one of a flash memory type, a hard disk type, a multimedia card micro type, a card type (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways.

Accordingly, the invention should not be limited to the specific embodiments described herein, but should be accorded the broadest scope consistent with the principles and novel features disclosed herein.

The invention claimed is:

1. A method for requesting a bandwidth by a mobile station (MS) in a wireless communication system, the method comprising:
receiving a message from a base station (BS), wherein the message includes information indicating whether or not the BS automatically allocates an additional bandwidth caused by a signaling overhead for a fragmented protocol data unit (PDU) without a request for the additional bandwidth;
requesting a first bandwidth, required to transmit a first PDU, from the BS;
receiving an allocation of a second bandwidth less than the first bandwidth from the BS;
fragmenting the first PDU according to the second bandwidth to generate a second PDU and a third PDU;
transmitting the second PDU through the second bandwidth to the BS; and
starting a first timer upon receiving the allocation of the second bandwidth or upon transmitting the second PDU if the information indicates that the BS automatically allocates the additional bandwidth;
wherein the message corresponds to a registration response (REG-RSP) message or a ranging response (RNG-RSP) message.

2. The method according to claim 1, further comprising receiving, from the BS, an allocation of a third bandwidth required to transmit the third PDU, wherein the third bandwidth is automatically allocated by the BS without a request for the third bandwidth.

3. The method according to claim 1, wherein a value of the first timer is received from the BS through a MAC management message.

4. The method according to claim 1, wherein a value of the first timer is predetermined between the BS and the MS.

5. The method according to claim 1, further comprising requesting, from the BS, a third bandwidth required to transmit the third PDU if the MS does not receive an allocation of the third bandwidth from the BS until the first timer expires.

6. The method according to claim 1, further comprising starting a second timer after requesting the first bandwidth required to transmit the first PDU,
wherein the starting of the first timer includes restarting the second timer.

7. A method for a base station (BS) to allocate a bandwidth in a wireless communication system, the method comprising:
transmitting a message to a mobile station (MS), wherein the message includes information indicating whether or not the BS automatically allocates an additional bandwidth caused by a signaling overhead for a fragmented protocol data unit (PDU) without a request for the additional bandwidth;
receiving a request for a first bandwidth required to transmit a first PDU from the MS;
allocating a second bandwidth less than the first bandwidth to the MS; and
receiving a second PDU through the second bandwidth,
wherein, when the MS receives the allocation of the second bandwidth less than the first bandwidth, the MS fragments the first PDU into the second PDU and a third PDU and starts a timer upon receiving the allocation of the second bandwidth or upon transmitting the second PDU to the BS if the information indicates that the BS automatically allocates the additional bandwidth; and
wherein the message corresponds to a registration response (REG-RSP) message or a ranging response (RNG-RSP) message.

8. The method according to claim 7, further comprising allocating a third bandwidth, required to transmit the third PDU, to the MS, wherein the third bandwidth is automatically allocated by the BS without a request for the third bandwidth.

9. The method according to claim 7, wherein a value of the timer is transmitted to the MS through a MAC management message.

10. The method according to claim 7, wherein a value of the timer is predetermined between the BS and the MS.

11. The method according to claim 7, wherein a third bandwidth required to transmit the third PDU is requested by the MS if the MS does not receive an allocation of the third bandwidth from the BS until the timer expires.

12. A mobile station (MS) in a wireless communication system, the MS comprising:
a transmission module;
a reception module; and
a processor configured to:
receive a message from a base station (BS) via the reception module, wherein the message includes information indicating whether or not the BS automatically allocates an additional bandwidth caused by a signaling overhead for a fragmented protocol data unit (PDU) without a request for the additional bandwidth;
request a first bandwidth, required to transmit a first PDU, from the BS;
receive an allocation of a second bandwidth less than the first bandwidth from the BS via the reception module;
fragment the first PDU according to the second bandwidth to generate a second PDU and a third PDU;
transmit the second PDU through the second bandwidth to the BS via the transmission module; and
start a timer upon receiving the allocation of the second bandwidth or upon transmitting the second PDU if the information indicates that the BS automatically allocates the additional bandwidth,
wherein the message corresponds to a registration response (REG-RSP) message or a ranging response (RNG-RSP) message.

13. The MS according to claim 12, wherein a value of the timer is transmitted from the BS to the MS through a MAC management message.

14. The MS according to claim 12, wherein a value of the timer is predetermined between the BS and the MS.

15. The MS according to claim 12, wherein the processor is further configured to request, from the BS, a third bandwidth required to transmit the third PDU if the MS does not receive an allocation of a third bandwidth from the BS until the timer expires.

16. The MS according to claim 12, wherein the processor is further configured to receive, from the BS, an allocation of a third bandwidth required to transmit the third PDU, wherein the third bandwidth is automatically allocated by the BS without a request for the third bandwidth by the MS.

17. A base station (BS) in a wireless communication system, the BS comprising:
a transmission module;
a reception module; and
a processor configured to:
transmit a message to a mobile station (MS) via the transmission module, wherein the message includes information indicating whether or not the BS automatically allocates an additional bandwidth caused by a signaling overhead for a fragmented protocol data unit (PDU) without a request for the additional bandwidth;
receive a request for a first bandwidth required to transmit a first PDU from the MS via the reception module;
allocate a second bandwidth less than the first bandwidth to the MS; and
receive a second PDU through the second bandwidth via the reception module,
wherein, when the MS receives the allocation of the second bandwidth less than the first bandwidth, the MS fragments the first PDU into the second PDU and a third PDU and starts a timer upon receiving the allocation of the second bandwidth or upon transmitting the second PDU to the BS if the information indicates that the BS automatically allocates the additional bandwidth, and
wherein the message corresponds to a registration response (REG-RSP) message or a ranging response (RNG-RSP) message.

18. The BS according to claim 17, wherein the value of a timer is transmitted through a MAC management message.

19. The BS according to claim 17, wherein the processor is further configured to allocate a third bandwidth required to transmit the third PDU, wherein the third bandwidth is automatically allocated by the BS without a request for the third bandwidth by the MS.

20. The BS according to claim 17, wherein a value of the timer is predetermined between the BS and the MS.

21. The BS according to claim 17, wherein the MS requests a third bandwidth required to transmit the third PDU if the MS does not receive an allocation of the third bandwidth from the BS until the timer expires.

* * * * *